United States Patent [19]
Gabor

[11] Patent Number: 6,069,999
[45] Date of Patent: May 30, 2000

[54] METHOD FOR COMPRESSING AND DECOMPRESSING FONT DATA

[75] Inventor: Csaba Peter Gabor, Portland, Oreg.

[73] Assignee: Microsoft Corporation, Redmond, Wash.

[21] Appl. No.: 08/129,425

[22] Filed: Sep. 29, 1993

Related U.S. Application Data

[63] Continuation of application No. 07/687,306, Apr. 18, 1991.

[51] Int. Cl.[7] .................................................... G06K 15/00
[52] U.S. Cl. ........................................... 395/110; 395/115
[58] Field of Search ........................... 395/101, 114–116, 395/112; 382/182; 358/467, 426, 261.1, 261.2, 261.4, 431; 345/202

[56] References Cited

U.S. PATENT DOCUMENTS 4,555,802  11/1985  Fedak et al. ................................ 382/56
5,046,027   9/1991  Taaffe et al. .............................. 395/114

OTHER PUBLICATIONS

IBM Technical Disclosure Bulletin vol. 8, Jan. 1986 No. 8 "Compression/Decompression of Fon–7–Pattern".

*Primary Examiner*—Arthur G. Evans
*Attorney, Agent, or Firm*—Jones & Askew, LLP

[57] ABSTRACT

A novel font compression method is disclosed that incorporates a plurality of data encoding techniques for compressing bit map font data or the like. Such individual characters of a font are represented in blocks comprised of a plurality of lines of data. The font data is first encoded according to encoding techniques that are applicable to the blocks of character data. Subsequently, each line of data is further encoded according to one of several selected encoding techniques. A selection of which technique to use for encoding a particular line is made by determining the length of data that will result from encoding using each of the selected techniques and comparing the lengths to select the technique yielding the shortest encoded data length. A novel Group encoding method is disclosed having particular application to bit strings of data having several groups of identical data bits. According to Group encoding each group is encoded by providing a first encoded portion including unit encoding bits and a second encoding portion including a binary representation of the remainder bits after subtracting the number encoded by the unit encoding bits. A font cartridge apparatus manufactured in accordance with the present invention is disclosed.

36 Claims, 8 Drawing Sheets

METHOD FOR COMPRESSING AND DECOMPRESSING FONT DATA

CROSS-REFERENCE TO RELATED APPLICATION

This application is a continuation of U.S. patent application Ser. No. 07/687,306, filed Apr. 18, 1991.

TECHNICAL FIELD

The present invention is directed in general toward a method for compressing binary data and, more particularly, toward a method for compressing binary data of the type used to define character fonts for printing.

BACKGROUND OF THE INVENTION

Increasing use of personal computers as word processors has brought an increased need for providing a plurality of font types for use with printers especially in conjunction with word processing programs. A "font," as used herein, refers to a group of characters having particular distinguishing configuration properties. Several fonts which are currently in use include Courier, Letter Gothic, Presentation, Times Roman, etc.

A common method of providing digital characterization of font characters is to provide a bit map representation for each character of the font. A bit map representation is a map of the character into a plurality of bit positions arranged in lines and columns, wherein each bit position represents a binary data bit. Typically, bit maps have whole bytes of columns, i.e., columns having 8 bits, 16 bits, 24 bits, etc. Association of a bit position with a zero indicates no character portion in that bit position of the map. Conversely, association of a bit position with a "1" indicates the existence of a portion of the character in that bit position of the map. Accordingly, printing in all bit positions of the map that are associated with a "1" will reproduce the character defined by the bit map. Mapping a character in this fashion may be accomplished using several conventions. As an example, and as used herein, the first line of the bit map represents the top of the character while the bottom line of the bit map represents the bottom of the character. Additionally, the first column of the bit map represents the left side of the character and the last column of the bit map represents the right side of the character. The data of a bit map that represents a single character is sometimes referred to as a "character block" of data.

Most personal computers and word processors that use font data include a printer for reproducing the characters of the font on a printed page. Printers that are particularly suited for reproducing bit map character data are referred to as "Scan line" printers. Scan line type printers are constructed to reproduce the first line of all bit mapped characters in a printed line, followed by the second line of all bit mapped characters in the printed line and continuing in this fashion until all characters in the printed line have been reproduced. Laser printers that are now commonly in use typically operate on a scan line basis. For these and other scan line type printers, font data may be permanently stored in the memory of cartridges that are mechanically and electrically coupled to the printer. The printer accesses the stored font data during a printing operation to receive the bit mapped data of the characters being printed. Since the font data is permanently stored in memory, the time necessary to compress the data is not critical. However, it is important to minimize the time necessary to decompress the data during printing. The amount of data storage available in a cartridge is limited and consequently the amount of font data that can be stored is limited.

In an effort to increase the number of varying fonts available to a particular user, without unnecessarily increasing the data storage requirements of the font data, it is desirable to provide a method for compressing the font data so that storage of the data requires a minimum amount of memory space. The compressed font data can then be decompressed before printing to insure accurate reproduction of the character.

Many compression and decompression techniques presently known rely upon recurring patterns in a data stream to enable efficient compression and later decompression of the data. Data encoding for facsimile transmission is one such example. Since most printed pages contain a small percentage of printing, the transmitted data typically include a series of data bits, the series having a large number of sequential zeros separated by smaller numbers of sequential ones. One method of compressing this data for transmission is to provide a binary-encoded number that identifies the number of zeros or ones in a sequence. Using this method, a sequence of 15 zeros can be encoded with just five data bits, as opposed to the 15 data bits required if the data is not encoded. However, this method of encoding is not efficient for data that has small numbers of sequential ones or zeros. Accordingly, the encoding sequence that is selected is dependent in large measure upon the nature of the data to be encoded.

Because many printers reproduce font data using "scan lines," it is desirable to store font data so that it can be reproduced on a line-by-line basis. For example, it is desirable to use a method for compressing font data wherein the first line of each character on a printed line can be decompressed and reproduced followed by the second line of each character, etc, until the last line of each character for that line is reproduced.

Further, since it is desirable to reduce the amount of time necessary to print a document, it is also desirable to reduce the amount of time necessary to decompress the compressed font data. However, it is noted in this regard that it is not necessary to reduce the amount of time necessary for compression of the font data. This is because the font data is compressed once and, thereafter, stored in memory. Subsequently, the data is only decompressed for printing. The compressed data remains stored in memory.

SUMMARY OF THE INVENTION

The invention comprises a method for encoding data of the type that results from bit map characterization of font data to provide a plurality of bit strings. The method includes the step of selecting at least first and second encoding methods wherein each method is suitable for compression and decompression of font data. Thereafter, each bit string of the font data is analyzed to determine the number of encoded data bits that will result from encoding the bit string using the first encoding method. Similarly, each bit string is analyzed to determine the number of encoded data bits that will result from encoding the bit string using the second encoding method. Thereafter, the plurality of bit strings are analyzed to determine which bit strings should be encoded using the first method and which bit strings should be encoded using the second method.

In a particularly preferred embodiment of the invention, a novel encoding technique, referred to herein as Group encoding, may be used for encoding a group of identical data bits. In accordance with the Group encoding method, a first encoded portion is provided to indicate the number of whole units of identical data bits in the group to be encoded wherein a unit is a predetermined number of data bits. Thereafter, a second encoded portion is provided to indicate the number of identical data bits less than a whole unit that remain after the number of identical data bits in the group have been divided by the unit.

DETAILED DESCRIPTION OF THE PREFERRED INVENTION

The present invention comprises method for encoding and decoding data of the type that results when font data is characterized using a bit map representation of each character of the font. Such a representation provides a block of character data wherein each block includes a plurality of lines of data necessary for representing a single character of a single font. It will be apparent, however, to those skilled in the art, that the method of the present invention could be used with data that results from other characterizations of font characters. Further, the invention will find application to data that relates to applications other than character fonts.

A typical apparatus for performing the encoding according to the method of the subject invention includes data processors, such as computers and microcomputers, constructed for processing binary encoded digital data. With particular reference to font data, it will be apparent to those skilled in the art that the apparatus used to encode, or compress, the font data need not be the same as the apparatus used to decode, or decompress, the font data. As an example, a large "mainframe" type computer may be used to receive data representing a plurality of fonts, wherein each font includes a plurality of characters. This data may then be encoded according to the subject encoding method and stored on font cartridges, as is known in the art The font cartridges may then be used in combination with laser-jet printers for printing any of the plurality of stored fonts. In this regard, the laser-jet printer may include its own data processor for decoding the stored font data.

Figure 1:
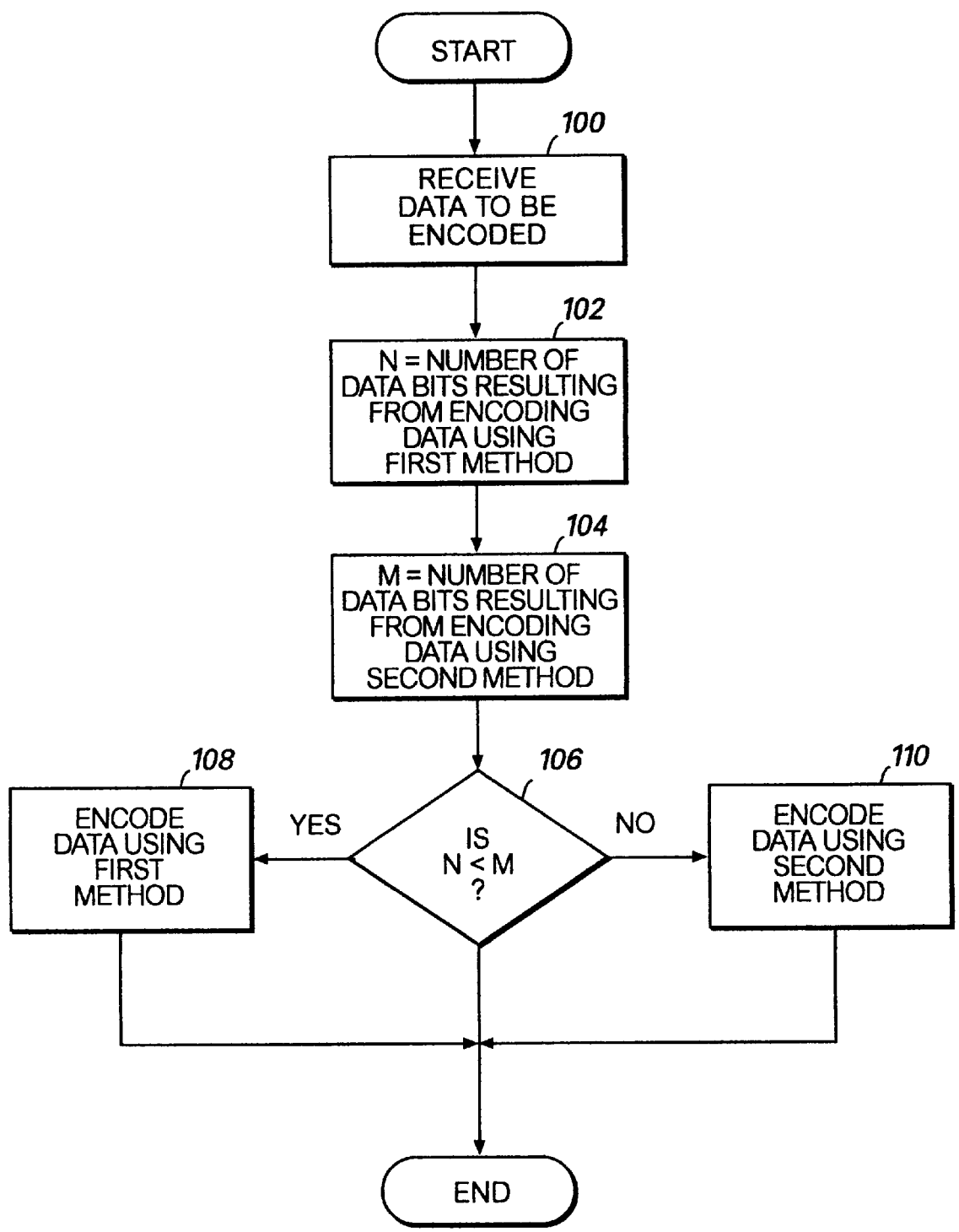
FIG. 1 is a decision flow diagram illustrating a preferred method of encoding in accordance with the subject of the invention.

A preferred method of the subject invention, illustrated in the decisional flow diagram of FIG. 1, generally comprises an encoding method wherein at least first and second encoding techniques are combined to encode font data. In accordance with the method, the data to be encoded is analyzed to determine the best encoding technique for particular portions of the data. The method is initiated at step 100, wherein the data to be encoded is received by a data processor adapted to perform the subject encoding method, referred to herein as the encoding processor. The received data comprises only a portion of the font data to be encoded.

In the presently preferred embodiment of the invention, the received font data comprises a bit string, wherein the bit string comprises data that results from bit map representation of a line of a character of a font. It will be apparent to those skilled in the art that any portion of the data to be encoded may be selected for the bit string referred to herein.

The received bit string is next analyzed to determine the best encoding technique to be used. As discussed above, at least first and second encoding techniques are analyzed in connection with each received bit string. Although the flow diagram of FIG. 1 describes the invention by reference to first and second encoding techniques, additional encoding techniques may be used as will be described below with reference to FIGS. 4A, 4B and 4C. The first and second encoding techniques may comprise any known encoding techniques that are suited for the data to be encoded. Once selected, the encoding techniques will remain the same for all data of all fonts to be encoded. The best encoding technique for a particular bit string is selected as the encoding technique that results in the fewest encoded data bits. To this end, the number N of data bits that will result from encoding using the first encoding technique is determined, step 102. Similarly, the number M of data bits that will result using the second encoding technique is determined, step 104. Since different encoding methods are particularly suited for encoding data having different data sequence characteristics, the number of data bits which will result from encoding the data using the first method will differ from the number of data bits that will result from encoding data using the second method. In this regard, a determination is made of which of the first or second encoding methods results in the least number of encoded data bits, step 106. Thereafter, the data is encoded according to the encoding technique that results in the least number of encoded data bits, steps 108 and 110.

It will be apparent to those skilled in the art that by selecting the encoding technique that results in the least number of encoded data bits, the method of the subject invention will significantly conserve the amount of memory needed to store the encoded data bits. Further, it should be apparent to those skilled in the art that the amount of data received will significantly affect the memory savings achieved by encoding the data using alternative encoding techniques. The data received may define a plurality of fonts, with each font including a plurality of characters. Alternatively, the data received may define a single font having a plurality of characters. Still further, the received data may define an individual character or a portion thereof.

It will also be apparent to those skilled in the art that the optimum selection of the encoding techniques to be used will depend on the nature of the data to be encoded. Like facsimile data, font data typically includes a plurality of sequential ones separated by a plurality of sequential zeros. Accordingly, when the method of FIG. 1 is used for encoding font data, it is desirable to select encoding techniques suitable for encoding data including a plurality of sequential ones and zeros. One such method, which comprises a portion of the subject invention, is referred to herein as Group encoding. The decisional flow diagram describing Group encoding is provided in FIGS. 2A and 2B.

Generally, Group encoding is an encoding technique that is particularly suited for bit strings that include more than one group of sequential ones or more than one group of sequential zeros. The term "group" is used herein to refer to a plurality of identical data bits. According to the preferred method of Group encoding, each group in a bit string is encoded in a manner to indicate the number of identical data bits in the group. The first step to encode the group is therefore to determine the number of identical data bits in the group. A common unit, i.e., predetermined number of data bits (1 in the presently preferred embodiment of the invention), may be subtracted from the number of identical data bits to arrive at the number to be encoded. A first encoded portion is provided wherein each bit of the first encoded portion represents a complete unit of identical data bits in the number to be encoded, and wherein a unit represents a preselected number of identical data bits (eight in the presently preferred embodiment of the invention). A second encoded portion is provided wherein the second encoded portion is a binary representation of the remainder after the number to be encoded is divided by the unit. The first encoded portion is separated from the second encoded portion by a zero to distinguish between the two.

As an example of Group encoding, assume a group of identical data bits to be encoded includes 69 sequential ones. If the common unit to be subtracted from the group is one, then the number to be encoded would be 68. Further, assume a unit is equal to eight data bits. Then the first portion of the encoded group would have eight ones, representing eight bytes of sequential ones in the number to be encoded. The second group would be a binary representation of four, i.e., (100), the remaining number of ones in the number to be encoded. The two encoded portions are separated by a zero, so that the Group encoding for a group having 69 identical data bits is "111111110100."

Separating the first encoded portion and the second encoded portion by a zero allows the number of ones provided in the first encoding portion to be variable. In this manner, the number of fixed "overhead" bits that are required is minimized, in contradistinction to the case where a binary representation of the number of ones or zeros in each group is used. In other words, if simply a binary representation is used, the encoding technique must use in every case the number of bits needed to specify the greatest possible number of ones or zeros to be described. However, for all other groups having less than this greatest number, many of the bits will not be necessary. For these groups, the "overhead" of unnecessary bits renders the method unacceptable. The Group encoding technique, described in more detail below by reference to FIGS. 2A and 2B, overcomes this problem.

Figure 2A:
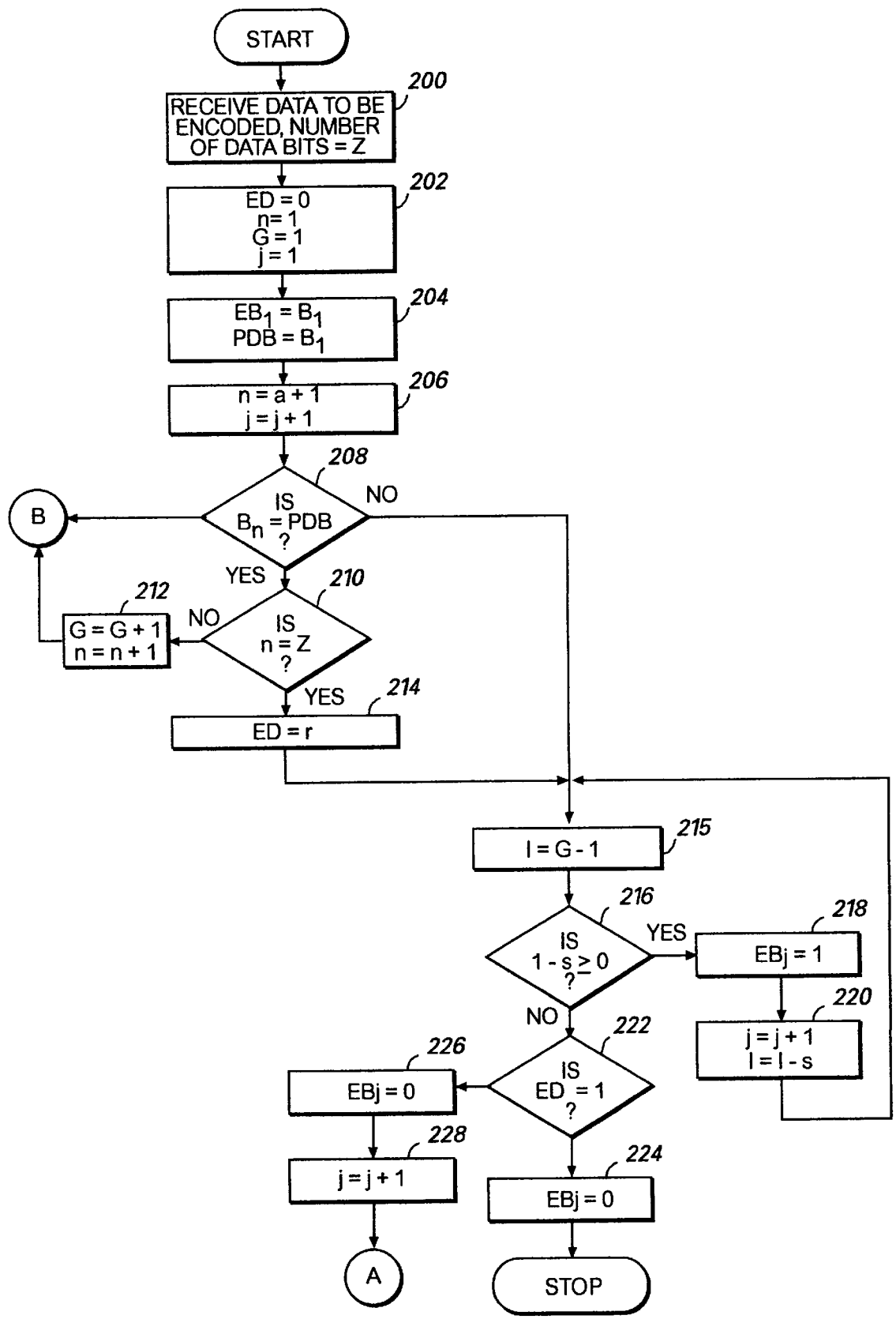
FIGS. 2A and 2B are flow diagrams illustrating the Group encoding method in accordance with a preferred embodiment of the invention.
Figure 2B:
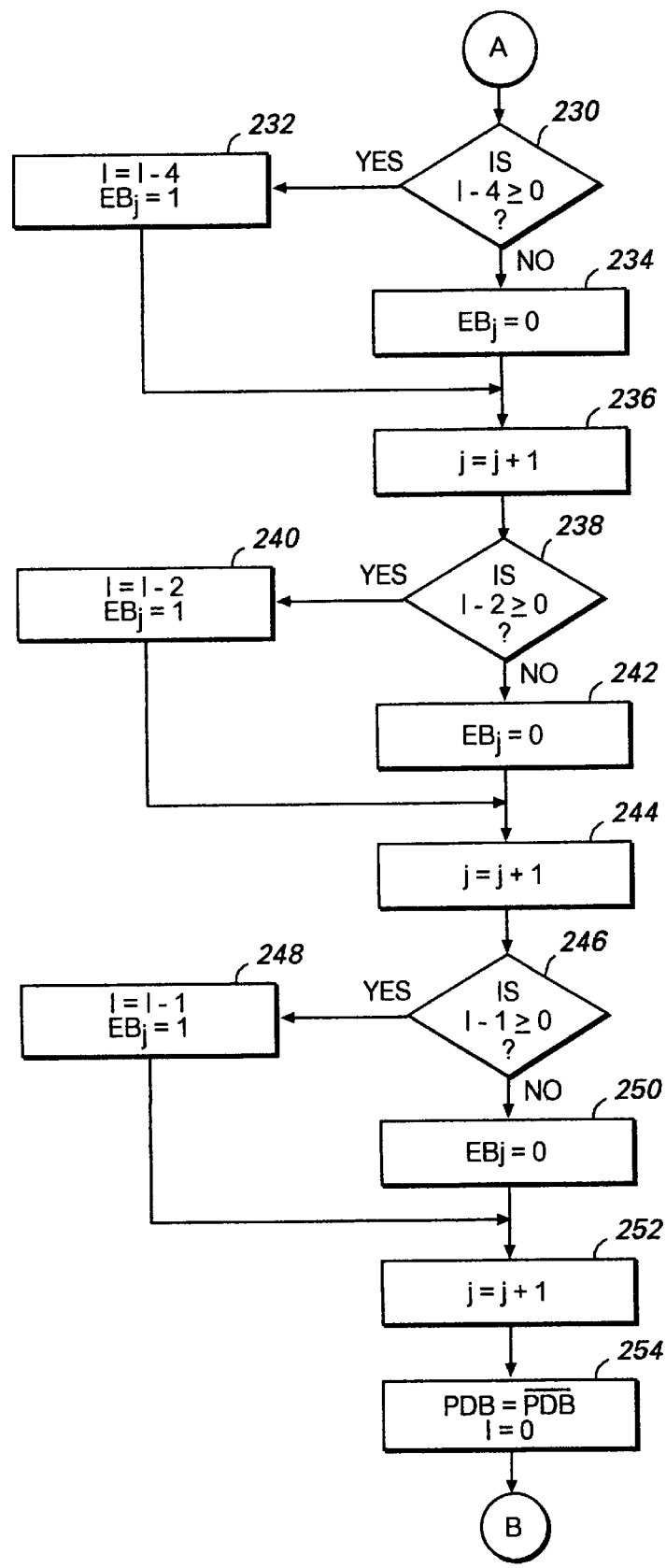

A flow diagram illustrating a preferred method of encoding according to the Group encoding technique is provided in FIGS. 2A and 2B.

Therein, the font data to be encoded is received, step 200. The data to be encoded may comprise any portion of the font data. Herein, the portion of data that is to be encoded is referred to as a bit string wherein each bit string includes a plurality of groups of identical data bits. The number of data bits in the bit string is recorded as a variable Z, step 200.

After the bit string to be encoded is received a flag, ED, is set equal to zero, a counter G is set equal to one and two indices, n and j, are set equal to one, step 202. The flag ED is used to indicate the end of the bit string and will be set equal to one when the end of the bit string is reached, as will be described more fully below. The counter G varies from 1 to the number of ones or zeros in a group and is therefore used to indicate the number of identical data bits in a group. Each bit of the bit string is referred to by a variable $B_n$. The index n varies from 1 to the number of bits in the bit string. The variable $B_n$ is used to indicate the state of the bit that is currently being encoded. Each encoded data bit is referred to by the variable $EB_j$. The index j varies from 1 to the number of encoded data bits generated. The variable $EB_j$ is used to indicate the state of the encoded data bit that is being generated.

In the presently preferred method of Group encoding, a first encoded data bit is provided to indicate whether the first group of identical data bits is a group of ones or zeros. Accordingly, the first encoded data bit $EB_1$ is set equal to the first data bit $B_1$ of the bit string, step 204. A flag PDB is used to indicate whether the group of identical data bits being encoded is a group of ones or zeros. Accordingly the flag PDB is also set equal to the value of the first data bit $B_1$, step 204. The indices n and j are thereafter incremented by one, step 206.

In accordance with the Group encoding method, the number of consecutive ones or zeros in the bit string must be determined. This is accomplished in the preferred embodiment of FIGS. 2A, 2B via a counting module, steps 208–214. The counting module first determines if the data bit currently being encoded $B_n$ is equal to the state of the flag PDB, step 208, and, if so, determines whether the bit presently being encoded $B_n$ is the last bit in the bit string, step 210. If the data bit being encoded $B_n$ is equal to the flag PDB and is not the last data bit in the bit string, then the counter G is incremented by one to indicate another identical bit in the group, step 212. The index n is also incremented, step 212, to index the next data bit in the bit string. The determination of steps 208 and 212, is continued until either the data bit being examined $B_n$ is not equal to the present data bit PDB, or the data bit being examined $B_n$ is the last data bit Z, thereby indicating the end of the bit string. If the data bit $B_n$ being examined is not equal to the flag PDB, step 208, then the method moves directly to a byte counter routine, steps 216–220. If the data bit being examined $B_n$ is the last data bit, step 210, then the method will set the flag ED equal to one before proceeding to the byte counter routine. It will be noted by those skilled in the art that upon exiting the counting module the counter G will be equal to the number of sequential ones or zeros in the group.

After the number of identical data bits in a group have been determined the number to be encoded I must be determined. Generally, the number to be encoded I is representative of the number of data bits G in the group. In the presently preferred embodiment of the invention, the number to be encoded I is equal to the number of data bits in the group G minus 1, i.e., I=G−1. One is a common unit that is always subtracted from the number of identical data bits to further minimize the length of the encoded bit string. In compressing font data, as well as in encoding most data strings, there will never be a need to encode a group having zero identical data bits. Therefore, the encoding for a 0 can be used to indicate one identical data bit in a group; the encoding for 1 can be used to indicate two identical data bits in a group; etc. Ultimately, the number of encoded data bits will be minimized. Those skilled in the art will recognize that the number to be encoded I may represent the number of data bits G in the group in various manners. For example, for some applications the number of data bits in the group may always be greater than seven. Accordingly, the number to be encoded may always be equal to the number of data bits in the group G minus 7, i.e., I=G−7.

The number to be encoded I must be examined to determine the number of bytes of identical data bits in the number. To this end it is determined whether I minus 8 is greater than or equal to zero, step 216. If so, at least one byte of identical data bits is in the group being encoded. Since a one is provided for each byte of sequential data bits in the number to be encoded, the next encoded data bit $EB_j$ is set equal to one, step 218. Thereafter the index j is incremented by one to index the next encoded data bit and the counter I is decremented to indicate that the first byte has been encoded. Steps 216–220 are repeated until I minus 8 is not greater than or equal to zero, step 216, at which time the byte counter routine is exited. Those skilled in the art will recognize that the byte counter routine, steps 216–220, simply provides a division of eight into I wherein an encoded data bit $EB_j$ is set equal to one for each set of eight bits in I and wherein the value of I upon termination of the byte counter routine is equal to the remaining number of data bits.

After the byte counter routine is completed the flag ED is examined, step 222, to determine whether the end of the bit string has been reached, i.e., whether the group presently being encoded is the last group of identical data bits in the bit string. As discussed above, the flag ED is set equal to one when the end of the bit string is reached. If the end of the bit string has been reached, then the last encoded data bit $EB_j$ is set equal one, step 224, thereby indicating that the remaining bits in the string are identical to the previous eight bits. It will be apparent to those skilled in the art that the method described herein for terminating the encoding of a bit string requires the decoder to have knowledge of the number of bits in the decoded data string. Otherwise, the remaining bits at the end of the bit string must be encoded and an alternative method for terminating the Group encoding employed, as will be discussed below.

If the data processor has not reached the end of the bit string to be encoded, then the data processor will set the next encoded data bit $EB_j$ equal to zero, step 226, to indicate that the next three encoded data bits will identify, in binary coded digital data format, the number of remainder ones or zeroes in the sequence. The index j is incremented by one, step 228, and a binary encoding portion, steps 230–252, of the Group encoding method is begun.

The binary encoding portion of the Group encoding method provides the binary coded digital data for the remaining number of identical data bits in the number to be encoded. Since less than eight identical bits will comprise the remainder, only three encoded data bits are required. With reference to FIG. 2B, the first of the three encoded data bits represents the most significant bit, i.e., $2^2$, and is provided by determining whether the number of identical data bits remaining in the number to be encoded, as indicated by the counter I minus four, is greater than or equal to zero, step 230. If so, the next encoded data bit $EB_j$ is set equal to one and the counter I is decremented by four, step 232. If not, the next encoded data bit $EB_j$ is set equal to zero, step 234. Thereafter, the index j is incremented by one, step 236, to index the next encoded data bit $EB_j$. The next data bit to be determined will be $2^1$. The number of remaining data bits I is compared to the value of two, step 238. If the number of remaining data bits as indicated by the counter I minus two is greater than or equal to zero, the next encoded data bit $EB_j$ is set equal to one, step 240, and the counter I indicating the number of identical data bits remaining in the number to be encoded is decremented by two. If there are less than two identical data bits remaining in the number to be encoded then the encoded data bit $EB_j$ is set equal to zero, step 242. The index j is incremented by one, step 244, and the least significant bit $2^0$ is determined. If the counter I is greater than or equal to one, step 246, the next encoded data bit $EB_j$ is set equal to one, step 248, and if the counter I is less than one the next encoded data bit $EB_j$ is set equal to zero, step 250. Thereafter, the index j is incremented by one, step 252, and the binary encoding portion of the Group encoding method is completed.

It will be apparent to those skilled in the art that the binary encoding portion of the Group encoding method is simply a routine for providing a binary coded representation of the number of identical data bits in the number to be encoded less than eight. Although the Group encoding method has been described above by reference to a particular routine for performing this function, any routine may be substituted therefor. Similarly, alternative methods for performing the functions of the counting module and the byte counter routine may be substituted without departing from the invention.

As an example, a mathematical equation may be used to determine the encoding of a group of sequential data bits wherein the group includes G' sequential bits. In this example, the number of data bits NB required to encode the group can be determined by the equation:

$$NB = \text{FLOOR}((G'-C)/\text{UNIT}) + (Y+1) \qquad (1)$$

wherein C represents any common unit to be subtracted from the group before encoding, in the example discussed above, 1 was the common unit; UNIT is a variable that equals the number of consecutive data bits represented by each digit provided in the first encoded portion, in the example discussed above, UNIT was equal to eight; and, Y represents the number of digits required to express the unit in binary, in the example discussed above, Y was equal to three. Generally, Y can be determined using the equation:

$$Y + \text{CEILING}(\log_2 \text{UNIT}). \qquad (2)$$

The number of bits that will be provided as the first encoded portion according to Group encoding may be expressed by the variable D as follows:

$$D = \text{FLOOR}((G'-C)/(\text{UNIT})) \qquad (3)$$

The Group encoding of the above characterized group will have a binary representation that may be determined using the equation:

$$EN = (2^{(1+Y)})(2^D - 1) + (G'-C) - (\text{UNIT}) + (D) \qquad (4)$$

Using the example above wherein the group included 69 sequential bits, C=1, UNIT=8 and Y=3:

$$D = \text{FLOOR}((69-1)/8) = 8 \qquad (5)$$

and the binary encoding is equal to the binary representation of the variable EN, the value of which is determined as follows:

$$EN = (2^{(1+3)})(2^8 - 1) + (69-1) - (8 \times 8) = (16 \times 255) + 68 - 64 = 4{,}084. \qquad (6)$$

The binary representation of 4,084 is "111111110100" as was found above for Group encoding of a group having 69 bits using the method illustrated in FIGS. 2A and 2B.

After step 250 has been performed the group has been completely encoded and encoding of the next group may begin. Since the identical data bits of the next group will be of opposite state from the group that has just been encoded, the state of the flag PDB is inverted, step 254, and the counter I is set equal to zero so that the next group can be encoded. The method returns to the counter module at step 208 to encode the next group.

As mentioned above, the present method is described for use when decoding bit strings wherein the number of bits in the decoded string are known to the decoder before decoding. Accordingly, the last group is not completely encoded, i.e., the remaining number of identical data bits in the last group is not represented in binary fashion but, instead, an additional byte is indicated in the last group. To do so, the flag $EB_j$ will be checked to see if the last data bit has been encoded, see step 222, prior to returning to the counting module at step 208. If the flag indicates the end of the bit string has been encoded, then the routine is completed.

Further, it will be apparent to those skilled in the art that although the invention is described herein by reference to a first encoding portion wherein each one represents a unit of eight identical data bits, a unit may be defined to include any number of identical data bits. The division of the byte counter module will be altered so that the number to be encoded, i.e., the counter I, is divided by the number of bits in the selected unit. Additionally, the number of bits required to identify the remaining identical data bits in the number to be encoded are preferably selected in conjunction with the selection of the unit. It will be apparent to those skilled in the art that the second encoding portion must comprise a fixed number of bits and, therefore, the number of bits selected is preferably minimized to reduce the fixed overhead of the Group encoding method. Generally, the number of bits necessary need not be greater than the number of bits required to represent the unit in binary format. Further, since the remainder is represented by binary format, it is desirable to select a unit equal to a power of two. However, such a restriction is not necessary. Further, it may desirable in some instances to represent the remaining number of identical data bits in other than binary encoded digital format.

An alternative embodiment of the method described by reference to FIG. 1 may now be described. Referring to the flow diagram of FIG. 3, a method is described that utilizes Group encoding as the first encoding technique and utilizes one run encoding as the second encoding technique. As is known in the art, one run encoding comprises a technique wherein data that includes one group of identical data bits is encoded by specifying the bit position where the group of continuous data bits begins and further specifying the number of data bits in the group. Decoding one run encoded data simply comprises providing a plurality of data bits of opposite state from the group before the start position of the group, reproducing the number of identical data bits in the group, and thereafter providing a plurality of data bits of opposite polarity from the group to the end of the bit string. Typically, encoding data according to the one run encoding technique is only beneficial for bit strings that have either one group of contiguous ones or one group of contiguous zeros. The combination of Group encoding and one run encoding illustrated in FIG. 3 is used for bit strings that typically include groups of ones or zeros wherein some bit strings have only one group of ones or zeros and some bit strings have more than one group of ones and more than one group of zeros.

Figure 3:
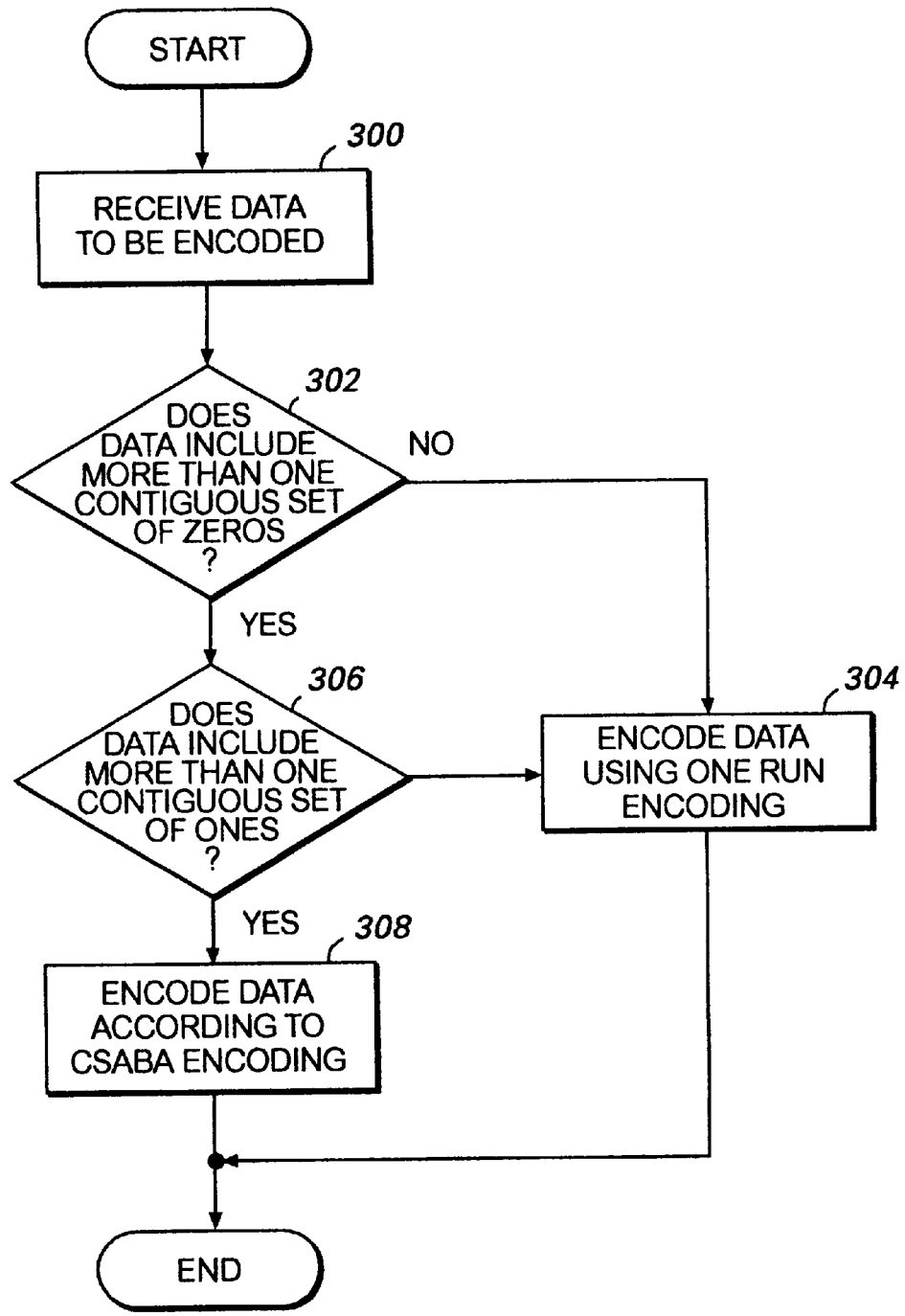
FIG. 3 is a flow diagram illustrating an alternative preferred method of encoding in accordance with the invention.

With reference to FIG. 3, the method begins by receiving the data to be encoded, step 300, wherein the data to be encoded comprises a bit string that may represent a line of a character of a particular font. As described by reference to FIG. 1, after the data to be encoded is received a determination is made as to which of the two encoding methods to use. The determination between Group encoding and one run encoding is made by determining whether the bit string to be encoded includes more than one group of ones and more than one group of zeros, steps 302–306. If the bit string to be encoded has only one group of zeros, step 302, then the data is encoded according to the one run encoding technique, step 304. Further, if the bit string to be encoded includes more than one group of zeroes, step 302, but only has one group of ones, step 306, then the bit string is encoded according to the one run encoding technique, step 304. However, if the data has more than one group of zeros, step 302, and more than one group of ones, step 306, then the data is encoded according to the Group encoding technique, step 308.

The above described method for determining which of the Group and one run encoding techniques results in the fewest encoded data bits represents an estimation of the relative performance of each technique and has been determined to provide acceptable performance in the preferred embodiment of the invention. In many applications it may be desirable to select between the two methods in the manner described above by reference to FIG. 1, i.e., by determining the number of encoded data bits that result from encoding the data string using each method. The number of encoded data bits that will result by encoding may be determined by first encoding and then counting the encoded data bits. This method may, however, be unacceptably time consuming for most applications. Alternatively, the maximum number of data bits that will result from encoding according to Group or one run may be determined using a mathematical equation. The maximum number of data bits that result from encoding using Group encoding technique may be expressed by N, wherein:

$$N=1+x+8(r)-(\text{FLOOR}(r/4)) \tag{7}$$

and wherein x equals the number of bytes in the bit string to be encoded and r equals the number of groups of ones in the bit string. The CEILNG and FLOOR functions refer to rounding the operand up to the next highest integer and down to the next lowest integer, respectively, as is known in the art. The number of encoded data bits that will result from encoding according to one run encoding may be expressed by M, wherein:

$$M=(6+2(\text{CEILING}(\log_2 x))) \tag{8}$$

and wherein x again equals the number of bytes in the data to be encoded. If:

$$N<M \tag{9}$$

then the bit string is encoded according to Group encoding and if not the bit string is encoded according to one run encoding. Those skilled in the art will readily appreciate that the above described method may be further enhanced by including in the calculation of the number of encoded data bits that result from the Group and one run encoding techniques any prefix bits that may be necessary to indicate that the bit string has been encoded according to the respective method.

Figure 4A:
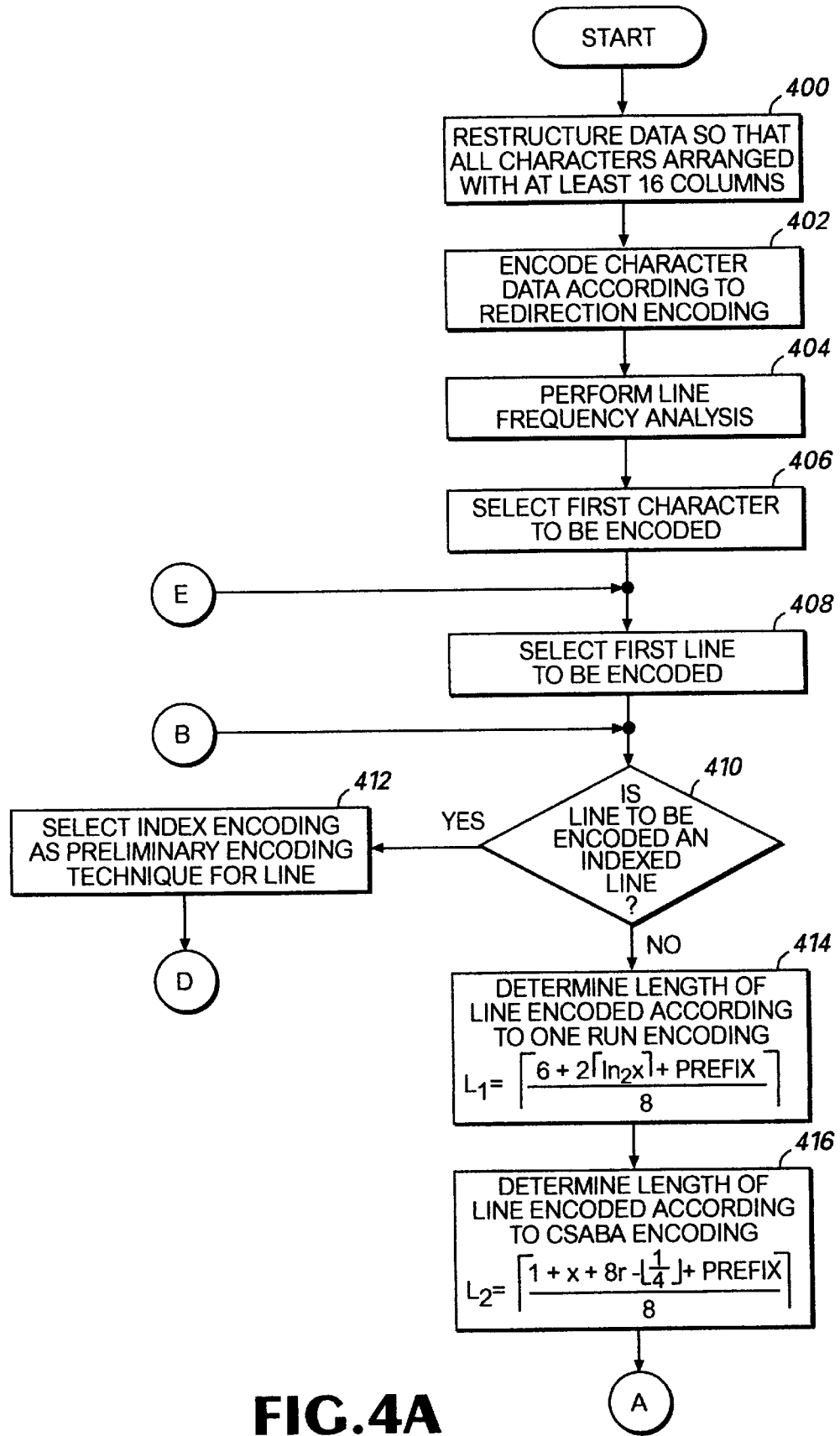
FIGS. 4A, 4B, and 4C are flow diagrams illustrating in detail preferred methods of the subject invention.
Figure 4B:
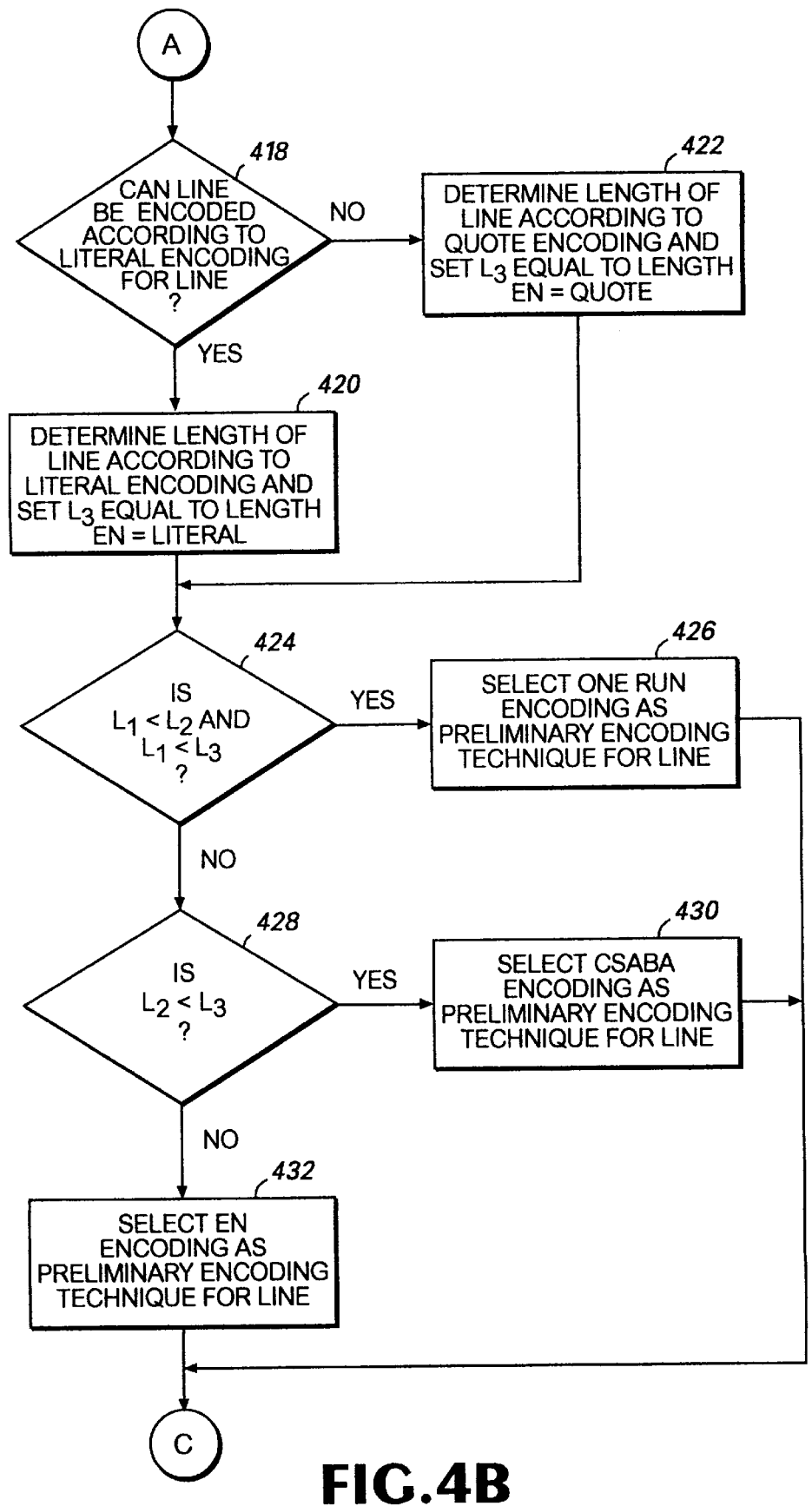
Figure 4C:
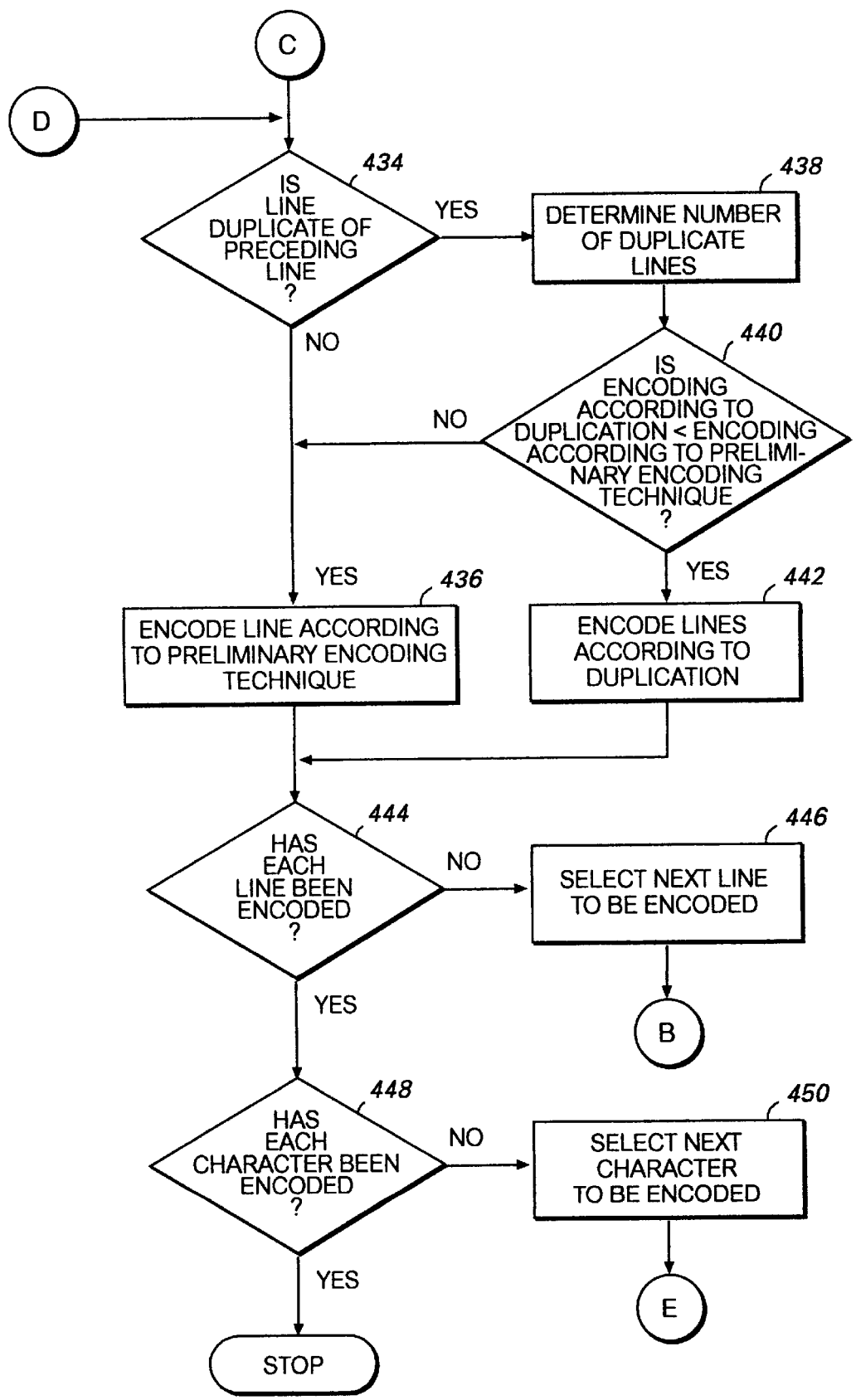

Further, the method for encoding font data described herein may be further enhanced by adding additional encoding techniques for encoding the plurality of bit strings that result from bit map representation of a plurality of fonts. A preferred implementation of such a method, referred to herein as the font compression routine, is illustrated in the flow diagram of FIGS. 4A, 4B and 4C. Therein, the novel Group encoding technique described above is combined with several other encoding techniques known in the art to provide a novel font compression routine for encoding font data that results from bit map representation of a plurality of fonts. It will be apparent to those skilled in the art that the font compression routine described below by reference to FIGS. 4A, 4B and 4C is a particularly novel implementation of the methods described above by reference to FIGS. 1, 2A and 2B, and 3.

The first step in the font compression routine is to restructure all the font data so that each font includes at least 16 columns (two bytes), step 400. Accordingly, fonts having only 8 columns are restructured to have half as many lines and twice as many columns. More particularly, every even line (wherein the first line is line 1) of a single byte font is restructured to be the second byte of the preceding odd line. Zeros are added as the second byte of the last odd line if necessary. As an example, a single byte wide font originally structured as follows:
line A
line B
line C
line D
line E
would be restructured as follows:
line A line B
line C line D
line E zeros After all single byte characters have been restructured, all characters of all fonts are encoded according to a redirection encoding technique, step 402. As is known in the art, redirection encoding comprises first identifying a group of characters that have common portions. Thereafter, a literal character is selected that will not be altered. The data describing the common portion of the remaining characters of the group is replaced by a reference to the common portion of the literal character. In the presently preferred embodiment of the invention only the tails, i.e., the bottom of the character represented by the last lines of the bit map, are redirection encoded, although as much of the tail as possible is so encoded. As an example, the tail, or bottom of the "i" and the "l" are the same for many fonts and would be redirection encoded.

The character restructuring and redirection encoding are encoding techniques that are applicable to blocks of character data instead of individual lines. To maximize the storage capacity of the memory of a font cartridge, however, it is desirable to encode the lines of the many blocks of character data. The remaining portion of the font compression routine operates upon the lines of the character blocks individually, as will be discussed in more detail below.

Prior to encoding of any one line of a character block of data, a line frequency analysis is performed to determine which lines of all characters occur with most frequency, step 404. The line frequency analysis is necessary to enable the character data to be index encoded. As is known in the art, index encoding comprises the steps of determining which lines of the character data occur with most frequency and establishing a table to record these lines as indexed lines. Thereafter, the indexed lines of the characters may be described by referring to the table. The number of lines that will be indexed will depend upon the number of lines that occur with relative frequency. Typically less than 16 of the most frequently occurring lines will be indexed as these lines can be referenced using only one byte of encoded bits. Those skilled in the art will recognize that not all sixteen locations that may be identified by a byte of data can be indexed since some of these combinations will be identical to the first bits of some lines and, therefore, cannot be used as an index. In some cases it may be desirable to include a second byte of indices thereby allowing more lines to be indexed. Those skilled in the art will readily determine when a second byte of indices will be desirable.

After the selected lines are indexed and the indices selected, the font compression routine will begin to encode each character of each font. Accordingly, the first character to be encoded is selected, step 406. The preferred font compression routine of the subject invention further encodes each character on a line by line basis. Accordingly, the first line of that character is selected to be encoded, step 408.

A preliminary selection portion of the font compression routine selects a preliminary encoding technique from several predetermined encoding techniques. The preliminary encoding technique is selected as a preliminary technique for the line of data; however, as will be described in more detail below, it may not be desirable to encode the character using this technique. If the line is an indexed line, step 410, then indexing is selected as the prelimary encoding technique for the line, step 412, and the preliminary selection portion of the font compression routine is concluded. If the line is not an indexed line, step 410, then other encoding techniques are examined to be used as possible preliminary encoding techniques. The first of these is one run encoding. The length $L_1$ in bytes of the encoded data that will result if one run encoding is used is determined assuming the line is encoded according to one run encoding, step 414, wherein:

$$L_1 = \text{CEILING}((6 + \text{Prefix} + 2(\text{CEILING}(\log_2 x)))/8) \tag{10}$$

and wherein x equals the number of bytes of data in the line and Prefix equals the number of bits in the prefix necessary to indicate one rim encoding. Similarly, an upper bound on the length of the encoded data $L_2$ that will result if the line is encoded according to Group encoding is determined, step 416, as follows:

$$L_2 = \text{CEILING}((1 + x + \text{Prefix} + 8(r) - (\text{FLOOR}(r/4)))/8) \tag{11}$$

and wherein x equals the number of bytes of data in the line, Prefix equals the number of bits necessary to indicate Group encoding and r equals the number of groups of ones in the line.

Two other encoding techniques are also examined for use as a possible preliminary encoding technique, i.e., literal and quote encoding. Literal encoding comprises no encoding at all simply leaving the line "as is." Quote encoding is a variation of literal encoding wherein the line is left as is but a prefix is added to identify the encoding as quote encoding. Those skilled in the art will recognize that literal encoding is preferred to quote encoding since the literal encoding for a line will always have less encoded bits than the quote encoding for the same line; the difference being the prefix added to the quote. However quote encoding will be necessary when the first several digits of a line may be confused by the decoder with a prefix of another encoding technique. If the line can be encoded according to a literal encoding technique, step 418 (FIG. 4B), then the length $L_3$ of the encoded data that will result if the line is encoded according to literal encoding is determined, step 420, and a flag EN is set equal to literal to indicate that the third method is literal encoding. If literal encoding cannot be used, step 418, then the length $L_3$ of the encoded line that will result if quote encoding is used is determined, step 422, and the flag EN is set equal to quote to indicate that the third encoding technique is quote encoding.

The selection of a preliminary encoding technique is now made between one run, Group, and the encoding technique indicated by the EN flag. The determination of which technique to select as the preliminary encoding technique is based upon which technique yields encoded data having the shortest length. If $L_1$ is less than $L_2$ and $L_1$ is less than $L_3$, step 424, then the one run encoding yields encoded data having the shortest length and the one run encoding technique is selected as the preliminary encoding technique, step 426. If, however, either $L_1$ is not less than $L_2$ or $L_1$ is not less than $L_3$, step 424, and if $L_2$ is less than $L_3$, step 428, then Group encoding is selected as the preliminary encoding technique, step 430. If $L_1$ is not less than $L_2$ or $L_1$ is not less than $L_3$, step 424, and if $L_2$ is not less than $L_3$, step 428, then the EN encoding is selected as the preliminary encoding technique, step 432. At this point the preliminary selection portion of the font compression routine is completed and a preliminary encoding technique has been selected from either index (step 412 of FIG. 4A), one run, Group, literal or quote encoding.

A final selection portion of the font compression routine determines whether the preliminary encoding technique will be used or whether the line will be encoded according to a duplicate encoding technique, FIG. 4C. If the line being encoded is not a duplicate of the preceding line, step 434, then duplicate encoding is not a possibility and the line will be encoded according to the preliminary encoding technique, step 436. However, if the line being encoded is a duplicate of the preceding line, then duplicate encoding is possible. The number of lines that are duplicated, including the present line and any consecutive following lines, is determined, step 438. Then the length of encoding these lines according to duplicate encoding is compared to the length for encoding each of these lines according to the preliminary encoding technique, step 440. Generally, encoding according to duplicate encoding comprises a prefix to indicate duplicate encoding wherein the prefix must include a specification of the number of duplicates followed by the line of data to be duplicated. This is to be compared to the length of the preliminary encoding technique multiplied by the number of duplicates, i.e., the number of times the line will be encoded if the preliminary encoding technique is selected. If encoding the total number of duplicates according to duplication is less than encoding the total number of duplicates according to the preliminary encoding technique, step 440, then duplication encoding is selected and the subject line plus its duplicates are encoded according to duplication encoding, step 442. If encoding according to duplication is not less than encoding according to the preliminary encoding technique, step 440, then the preliminary encoding technique is selected and the line is encoded according to the preliminary encoding technique, step 436.

To complete encoding of the font data the font compression routine determines whether each line of the character being encoded has been encoded, step 444, and if not, selects the next line to be encoded, step 446, and returns to step 410. If all lines of the character have been encoded, step 444, then the font compression routine determines whether all characters have been encoded, step 448, and if not, selects the next character to be encoded, step 450, and returns to step 408.

Although the data encoding methods discussed herein is described by reference to font data that has been generated using a bit map characterization of the characters of the fonts, it will be apparent to those skilled in the art that the methods will be equally applicable to font data generated using other characterizations. Further along these lines, it will be apparent to those skilled in the art that the methods discussed herein will find application to compression of data other than font data. In general, the methods discussed herein will find application to compression of any data wherein the amount data processing necessary for compression is not an essential consideration of the method used.

The manner in which data is decoded after is has been encoded by any of the methods discussed herein will be readily apparent to those skilled in the art. With particular reference to the font compression routine discussed above by reference to FIGS. 4A, 4B and 4C, decoding requires simply examination of the character header and the line prefixes to determine what encoding technique has been used. The decoding follows directly from knowledge of the encoding technique used. Further, it will be readily apparent to those skilled in the art that the font compression routine discussed herein requires much more data processing for encoding the font data than is required for decoding the font data. As examples of data processing necessary in the encoding of the font data that is not required in decoding is the line frequency analysis of step 404, the preliminary selection portion, steps 410–432, and the final selection portion steps 434, 438 and 440. Accordingly, the font compression routine described herein enables a designer of a font cartridge, for example, to reduce the memory necessary for storing font data, or conversely increase the number of fonts provided on a single font cartridge, without substantially increasing the time necessary for decoding and printing from the font cartridge.

Figure 5:
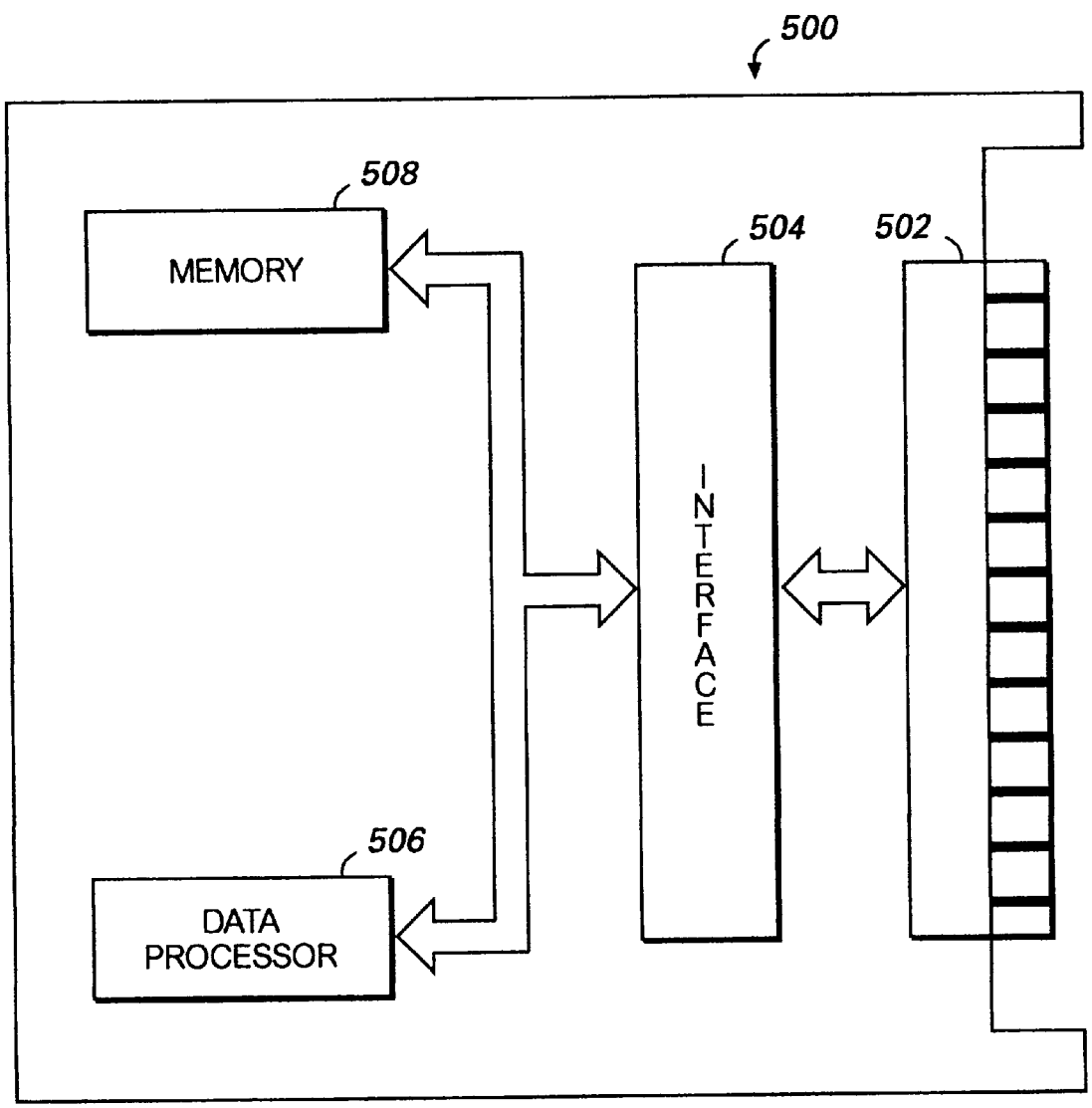
FIG. 5 is a block diagram illustrating a font cartridge for storing data compressed in accordance with the method of the subject invention.

With reference to FIG. 5, an illustrative block diagram of a font cartridge 500 constructed according to the methods of the present invention will be described. The font cartridge 500 includes a connector 502 for electrically connecting the font cartridge 500 with a printer, as is known in the art. The connector may comprise any standard interface and may be readily selected by those skilled in the art.

An electronic interface 504 is mounted within the font cartridge 500 for interfacing the connector 502 with a data processor 506. The electronic interface 504 may comprise any element, or combination of elements, for interfacing a standard data processing circuit with the connector 502 so that data may be provided to electronic elements external to the font cartridge 500 via the connector 502. As an example, the electronic interface 504 may include latches, drivers, timing circuitry, buffers, etc. Similarly, the data processor 506 may include standard data processing elements necessary for control and operation of the interface 504. Additionally, the data processor may include a standard microprocessor circuit for controlling the decompression of font data stored on the font cartridge 500.

The font cartridge 500 further includes memory 508 for storing data and instructions for control and operation of the font cartridge 500 as well as for reproduction of the fonts provided by the font cartridge 500. Typically the memory 508 may include read only memory (ROM) for storing the font data and, in some instances, for storing instructions for operation of the data processor 506. Additionally, the memory 508 may include a limited amount of random access memory (RAM) for use by the data processor 506 for temporary storage of processing data and instructions. Advantageously, the memory 508 is constructed to store font data that has been encoded by the data encoding methods discussed in detail above. Further, the memory may include instructions necessary for decompression of the stored font data.

It will be appreciated that, although specific embodiments of the invention have been described herein for purposes of illustration, various modifications may be made without departing from the spirit and the scope of the invention. Accordingly, the invention is not limited except as by the appended claims.

I claim:

1. A computer-implemented method for compressing font data for a printer wherein the font data is stored in a computer memory and includes a plurality of character strings each including information for bit map reproduction of a line of a character, the bit map comprising a map of the character into a plurality of bit positions arranged in lines and columns wherein each bit position represents a binary bit and wherein association of a bit position with a zero indicates no printing in that bit position of the map and association of a bit position with a one indicates printing in that bit position of the map such that printing in each bit position of the map will reproduce the character, the first line of the bit map including information for reproducing the top of the character, the last line including information for reproducing the bottom of the character, the first column including information for reproducing the left side of the character and the last column including information for reproducing the right side of the character, each of the character strings including a character specification number that identifies the configuration and font type of the character, a character header that identifies the height and width of the character and electrically generated binary character data that contains information for bit map reproduction of a line of the character, said method comprising the steps of:

(a) restructuring the stored electrically generated binary character data for all characters with eight columns according to a data restructuring technique, the data restructuring technique including the substeps of:

(1) restructuring each group of two original lines having eight columns to equal one restructured line having sixteen columns wherein the eight columns from the first original line comprise the first eight columns of the restructured line and wherein the eight columns of the second original line comprise the second eight columns of the restructured line, such that the restructured character string describing the restructured line includes the character specification number and character header of the original first line and includes sixteen bits of electrically generated binary character data; and (2) providing computer logic state zeros in the second eight columns of the last restructured line if the original electrically generated binary character data has an odd number of lines;

(b) encoding each character according to a redirection encoding technique, the redirection encoding technique including the substeps of:

(1) beginning from the last line and examining each line of each of the exclusive or encoded characters for commonalty thereby to identify a plurality of groups of common characters wherein each group of common characters has a plurality of characters with a plurality of lines that are identical;

(2) identifying one character of each group of common characters as the literal character and maintaining its exclusive or encoded electrically generated binary character data in its original exclusive or encoded form;

(3) redirection encoding each remaining character of each group of common characters by replacing the common exclusive or encoded electrically generated binary character data with an address indicating the identity of the literal character of the group and the line within the exclusive or encoded literal character to begin reproducing the remainder of the redirection encoded character; and (4) encoding the character header of all characters of a common group except the literal character to indicate redirection encoding;

(c) performing a line frequency analysis to determine which lines of all electrically generated binary character data occur with most frequency and providing an index table to record the lines occurring with most frequency;

(d) selecting the character to be encoded and identifying the selected character as the subject character;

(e) selecting the line of the subject character to be encoded and identifying the line as the subject line;

(f) determining whether the subject line is an indexed line and, if so, selecting indexing as the preliminary encoding technique and performing step j;

(g) determining the length of one run encoded data for the subject line wherein the length of one run encoded electrically generated binary character data may be determined by adding six to two times the ceiling of ($\log_2 x$) and adding the number of bits which need to be added as a prefix to indicate one run encoded data, and dividing the sum by eight, wherein x equals the number of bytes in the subject line;

(h) determining the length of Group encoded data for the subject line wherein the length of Group encoded data may be determined by adding one, x, 8(r) and the number of bits which need to be added as a prefix to indicate Group encoded data, subtracting the floor of (r/4) from this sum, and dividing the resultant number by eight, wherein x equals the number of bytes in the subject line;

(i) determining the length of literal encoded data for the subject line wherein the length of literal encoded data for the subject line equals the length of the subject line;

(j) determining the length of quote encoded data for the subject line wherein the length of the quote encoded data equals the length of the subject line plus a prefix necessary to identify quote encoded data;

(k) selecting as the preliminary encoding technique for each character string the encoding technique of steps (g)–(j) which yield the shortest encoded data length;

(l) determining whether the subject line is a duplicate of the previous line of the subject character, and if so, determining the number of subsequent duplicate lines of the subject character and the length of encoding all duplicates according to duplicate encoding, and if not, selecting the preliminary encoding technique as the encoding technique for the line and performing step (m);

(m) determining whether the length of encoded data according to duplicate encoding is less than encoding according to the preliminary encoding technique, and if so, selecting duplicate encoding as the encoding technique for the subject line and all subsequent duplicate lines of the subject character, and if not, encoding the subject line according to a duplication technique, the duplication encoding technique including the substeps of:

(1) encoding the data of the subject line to indicate duplication encoding and the number of times the data is duplicated; and (2) performing step (n);

(n) encoding the data according to the preliminary encoding technique as follows;

(1) encoding according to the literal encoding technique by not altering the data of the subject line;

(2) encoding according to the quote encoding technique by providing a prefix to indicate quote encoding and not altering the data of the subject line;

(3) encoding according to the one run encoding technique by providing a first byte of data to indicate at which column a group of contiguous computer logic state ones begins, providing a second byte of the data to indicate at which column the group of contiguous computer logic state ones ends and providing a prefix to indicate one run encoding; and (4) encoding according to the Group encoding technique by providing a prefix to indicate whether the first bit position of the electrically generated binary character data is a one or computer logic state zero, and, sequentially with respect to each group of contiguous computer logic state ones and computer logic state zeros:

(i) providing a one for each set of eight contiguous computer logic state ones or computer logic state zeros and deleting one bit from the set of contiguous computer logic state ones or computer logic state zeros;

(ii) providing a computer logic state zero if the number of contiguous computer logic state ones or computer logic state zeros remaining after step (n)(4)(i) is less than eight;

(iii) providing a modulo eight binary representation of the number of contiguous computer logic state ones or computer logic state zeros, less than eight, minus one remaining after step (n)(4)(i);

(iv) providing computer logic state ones for each group of eight or less contiguous computer logic state ones or computer logic state zeros that comprise the last set of contiguous computer logic state ones or computer logic state zeros; and (v) providing a electrically generated binary character data prefix to indicate Group encoded electrically generated binary character data;

(o) determining whether all lines of the subject character have been encoded and if not performing step e, and if so performing step (p); and (p) determining whether all characters have been encoded and if not performing step d.

2. A computer-implemented method for compressing electrically generated binary data comprising the steps of:

(a) identifying a group composed entirely of contiguous and identical electrically generated binary data bits and deleting a predetermined number of electrically generated binary data bits therefrom;

(b) providing a computer logic state one for each unit of contiguous and identical electrically generated binary data bits remaining in the group after step (a) wherein a unit is defined as a predetermined number of plural electrically generated binary data bits and deleting a unit of electrically generated binary data bits from the group for each computer logic state one provided;

(c) providing a computer logic state zero if the number of contiguous and identical electrically generated binary data bits remaining in the group after step (b) is less than a unit;

(d) calculating a count value of the number of contiguous and identical electrically generated binary data bits, less than a unit, remaining after step (b) and providing a binary representation of the count value; and (e) repeating steps (a)–(d) until all of the electrically generated binary data has been encoded.

3. The method as recited in claim 2 further including the steps of:

(f) determining the number of encoded electrically generated binary data bits that will result from encoding according to steps (a)–(e);

(g) determining the number of encoded electrically generated binary data bits that will result from a first alternative encoding technique; and (h) determining whether encoding according to steps (a)–(e) provides less encoded electrically generated binary data bits than the first alternative encoding technique and, if so, encoding the electrically generated binary data according to steps (a)–(e), and, if not, encoding the electrically generated binary data according to the first alternative encoding technique.

4. The method as recited in claim 3 wherein the number of encoded electrically generated binary data bits that will result from encoding according to steps (a)–(e) is determined using a mathematical equation.

5. The method as recited in claim 4 wherein the upper bound of the number of encoded electrically generated binary data bits that will result from encoding according to steps (a)–(e) is determined by the formula:

$$1+x+8(r)-(\text{FLOOR}(r/4))$$

wherein x equals the number of bytes of electrically generated binary data to be encoded, and r equals the number of contiguous strings of computer logic state ones in the electrically generated binary data to be encoded.

6. The method as recited in claim 3 wherein the number of encoded electrically generated binary data bits that will result from encoding using the first predetermined encoding technique is determined using a mathematical algorithm.

7. The method as recited in claim 3 wherein the first alternative encoding technique is one run encoding, wherein one run encoding comprises the substeps of:

(i) providing a first electrically generated binary data bit to indicate whether the first set of contiguous electrically generated binary data bits are computer logic state ones;

(j) providing a first byte of encoded electrically generated binary data to indicate the number of contiguous electrically generated binary data bits in the first set of contiguous electrically generated binary data bits;

(k) providing a subsequent byte of encoded electrically generated binary data to indicate the number of contiguous electrically generated binary data bits of the next set of contiguous electrically generated binary data bits; and (l) repeating step (k) until all contiguous computer logic state ones and computer logic state zeros have been encoded.

8. The method as recited in claim 3 further comprising the steps of:

(m) determining whether a second alternative encoding technique provides less encoded electrically generated binary data bits that either encoding according to steps (a)–(e) or the first alternative encoding technique and, if not, performing step (h), and, if so, encoding according to the second alternative encoding technique.

9. The method as recited in claim 8 wherein the second alternative encoding technique comprises not altering the character electrically generated binary data.

10. A method for compressing electrically generated binary data comprising the steps of:

(a) selecting at least first and second encoding methods suitable for the type of electrically generated binary data to be encoded;

(b) determining the number of encoded electrically generated binary data bits that will result from encoding using the first encoding method;

(c) determining the number of encoded electrically generated binary data bits that will result from encoding using the second encoding method;

(d) determining whether the number of encoded electrically generated binary data bits that will result from encoding using the first encoding method is less than the number of encoded electrically generated binary data bits that will result using the second encoding method and, if so, encoding the electrically generated binary data using the first encoding method and, if not, encoding the electrically generated binary data using the second encoding method;

wherein the first encoding technique comprises encoding according to Group encoding wherein encoding according to Group encoding comprises the substeps of:

(e) providing a computer logic state one for each set of eight contiguous and identical electrically generated binary data bits;

(f) providing a computer logic state zero if the number of contiguous and identical electrically generated binary data bits remaining after step (e) is less than eight;

(g) providing a modulo eight binary representation of the number of contiguous and identical electrically generated binary data bits minus computer logic state one; and (h) repeating steps (e)–(g) until all of the electrically generated binary data has been encoded.

11. The method as recited in claim 10 wherein the upper bound of the number of encoded electrically generated binary data bits that will result from encoding using the first encoding method is determined by using the formula:

$$1+x+8(r)-(\text{FLOOR}(r/4))$$

wherein x equals the number of bytes of electrically generated binary data to be encoded, and r equals the number of contiguous strings of computer logic state ones in the electrically generated binary data to be encoded.

12. The method as recited in claim 10 wherein the second encoding method is selected to be one run encoding and wherein encoding according to one run encoding comprises the substeps of:

(i) providing a first electrically generated binary data bit to indicate whether the first set of contiguous electrically generated binary data bits are computer logic state ones;

(j) providing a first byte of encoded electrically generated binary data to indicate the number of contiguous electrically generated binary data bits in the first set of contiguous electrically generated binary data bits; and (k) providing a subsequent byte of encoded electrically generated binary data to indicate the number of contiguous electrically generated binary data bits of the next set of contiguous electrically generated binary data bits.

13. The method as recited in claim 12 wherein the step of determining the number of encoded electrically generated binary data bits that will result from encoding using the second encoding technique comprises the substep of using the formula:

$$(6+2(\text{CEILING}(\log_2 x)))$$

wherein x equals the number of bytes in the electrically generated binary data to be encoded.

14. The method as recited in claim 11 wherein the second encoding method is selected to be one run encoding and wherein encoding according to one run encoding comprises the substeps of:

(i) providing a first electrically generated binary data bit to indicate whether the first set of contiguous electrically generated binary data bits are computer logic state ones;

(j) providing a first byte of encoded electrically generated binary data to indicate the number of contiguous electrically generated binary data bits in the first set of contiguous electrically generated binary data bits; and (k) providing a subsequent byte of encoded electrically generated binary data to indicate the number of contiguous electrically generated binary data bits of the next set of contiguous electrically generated binary data bits.

15. The method as recited in claim 12 wherein the step of determining the number of encoded electrically generated binary data bits that will result from encoding using the second encoding technique comprises the substep of using the formula:

$$(6+2(\text{CEILING}(\log_2 x)))$$

wherein x equals the number of bytes in the electrically generated binary data to be encoded.

16. A computer-implemented method for encoding electrically generated binary data comprising the steps of:

(a) determining whether the electrically generated binary data includes more than one group of contiguous computer logic state zeros and, if so, performing step (b), and, if not, encoding the electrically Generated binary data according to one run encoding wherein encoding according to one run encoding comprises the substeps of:

(1) providing a first electrically generated binary data bit to indicate whether the first set of contiguous electrically generated binary data bits are computer logic state ones;

(2) providing a first byte of encoded electrically generated binary data to indicate the number of contiguous electrically generated binary data bits in the first set of contiguous electrically generated binary data bits; and (3) providing a subsequent byte of encoded electrically generated binary data to indicate the number of contiguous electrically generated binary data bits of the next set of contiguous electrically generated binary data bits;

(b) determining whether the electrically generated binary data includes more than computer logic state one group of contiguous computer logic state ones and, if not, encoding the electrically generated binary data according to one run encoding and, if so, encoding the electrically generated binary data according to Group encoding wherein encoding according to Group encoding comprises the substeps of:

(1) identifying a group of contiguous and identical electrically generated binary data bits and deleting a common number of electrically generated binary data bits therefrom;

(2) providing a computer logic state one for each unit of contiguous computer logic state ones or computer logic state zeros remaining in the group after step (b)(1) wherein a unit is defined as a predetermined number of computer logic state ones or computer logic state zeros and deleting a unit of digits from the group for each computer logic state one provided;

(3) providing a computer logic state zero if the number of contiguous computer logic state ones or computer logic state zeros remaining in the group after step (b)(2) is less than a unit;

(4) providing a binary representation of the number of contiguous computer logic state ones or computer logic state zeros, less than a unit, remaining after step (b)(2); and (5) repeating steps (b)(1)–(b)(4) until all of the electrically generated binary data has been encoded.

17. A computer-implemented method for decoding electrically generated binary data that has been encoded using the Group encoding technique, the method comprising the substeps of:

(a) examining the first bit of encoded electrically generated binary data to determine whether the first set of contiguous electrically generated binary data bits are computer logic state one and, if so, identifying computer logic state one as the state of the present electrically generated binary data bit, if not, identifying computer logic state zero as the state of the present electrically generated binary data bit;

(b) determining whether the next electrically generated binary data bit is a computer logic state zero and, if not, performing step (c), and, if so, performing step (d);

(c) determining the number of contiguous computer logic state ones and providing a number of decoded electrically generated binary data bits equal to eight times the number of contiguous computer logic state ones each electrically generated binary data bit having a state equal to state of the preset electrically generated binary data bit, and repeating step (b);

(d) determining the modulo eight binary representation of the next three electrically generated binary data bits and adding one to determine the number of additional decoded electrically generated binary data bits to be provided and providing the additional electrically generated binary data bits in the state of the present electrically generated binary data bit and performing step (e);

(e) determining whether the state of the present electrically generated binary data bit is computer logic state zero and, if so, setting the state of the present electrically generated binary data bit to computer logic state one, and, if not, setting the state of the present electrically generated binary data bit to computer logic state zero, and performing step (f); and (f) repeating(g steps (b)–(e) until all of the encoded electrically generated binary data has been decoded.

18. A computer-implemented method for encoding a group of identical electrically binary data bits, said method comprising the steps of:

(a) providing a first encoded portion to indicate the number of whole units of identical electrical generated binary data bits in the group wherein a unit is a predetermined number of electrically generated binary data bits, the first encoded portion comprises a series of electrically generated binary data bits each having a first predetermined state wherein each electrically generated binary data bit represents a whole unit of identical electrically generated binary data bits in the group; and (b) providing a second encoded portion to indicate the number of identical electrically generated binary data bits less than a whole unit that remain after the number of identical electrically generated binary data bits in the group have been divided by the unit.

19. A computer-implemented method for encoding a group of identical electrically binary data bits, said method comprising the steps of:

(a) providing a first encoded portion to indicate the number of whole units of identical electrically generated binary data bits in the group wherein a unit is a predetermined number of electrically generated binary data bits; and (b) providing a second encoded portion to indicate the number of identical electrically generated binary data bits less than a whole unit that remain after the number of identical electrically generated binary data bits in the group have been divided by the unit, the second encoded portion comprises a binary representation of the number of identical electrically generated binary data bits that remain after the number of identical electrically generated binary data bits in the group have been divided by the unit.

20. The method as recited in claim 18 wherein the second encoded portion comprises a binary representation of the number of identical electrically generated binary data bits that remain after the number of identical electrically generated binary data bits in the group have been divided by the unit.

21. The method as recited in claim 20 wherein the first encoded portion and the second encoded portion are separated by an indicator electrically generated binary data bit having a second predetermined state wherein the indicator electrically generated binary data bit is provided to indicate the end of the first encoded portion and the beginning of the second encoded portion and wherein the second predetermined state is opposite the first predetermined state.

22. The method as recited in claim 20 wherein the number of electrically generated binary data bits that are provided in the second encoded portion is selected to enable binary representation of the predetermined number of electrically generated binary data bits in a unit minus one.

23. A computer-implemented method for encoding a group of identical electrically binary data bits, said method comprising the steps of:

(a) providing a first encoded portion to indicate the number of whole units of identical electrically generated binary data bits in the group wherein a unit is a predetermined number of electrically generated binary data bits; and (b) providing a second encoded portion to indicate the number of identical electrically generated binary data bits less than a whole unit that remain after the number of identical electrically generated binary data bits in the group have been divided by the unit, wherein a predetermined number of electrically generated binary data bits are deleted from the group before performing steps (a) and (b).

24. A font cartridge comprising:

memory means for storing font data wherein the stored font data has been compressed according to a font compression technique wherein the font data is compressed on a line by line basis and wherein the font data is compressed on a character by character basis, and for storing instructions for decompression of the stored font data, said memory means further includes means for storing instructions for decompressing font data that has been encoded according to Group encoding; and a data processor coupled to the memory means, the data processor being adapted to decompress the stored font data according to the stored instructions.

25. A font cartridge for storing electrically generated binary font data in a memory of the font cartridge wherein the font data includes a plurality of character blocks each including information for bit map reproduction of a character wherein each character block of font data includes a plurality of lines of electrically generated binary data each line representing a line of the bit map and wherein each line of electrically generated binary data includes a bit string, each bit position in the bit string representing a column of the bit map, said font cartridge being made by the computer-implemented process comprising the steps of:

(a) encoding the character blocks according to a first encoding technique technique applicable to a plurality of lines of at least one character block of electrically generated binary data;

(b) selecting a line of a character block of electrically generated binary data to be encoded and identifying the selected line as the subject line;

(c) selecting a preliminary encoding technique for the subject line wherein the selected preliminary encoding technique is selected from at least a second and third encoding technique;

said selecting a preliminary encoding technique comprises the substeps of:

(c1) determining the number of encoded electrically generated binary data bits that will result by encoding using the second encoding technique;

(c2) determining the number of encoded electrically binary data bits that will result by encoding using the using the third encoding technique;

(c3) selecting the encoding technique that yields the least number of encoded electrically generated binary data bits;

(d) encoding the select line according to the selected preliminary encoding technique;

(e) repeating steps (b)–(d) for each line of each character block of electrically generated binary data;

(f) storing the encoded electrically generated binary font data in the memory of said font cartridge; and (g) storing in the font cartridge memory, instructions for decoding the stored encoded electrically generated binary font data.

26. The font cartridge as recited in claim 25 wherein the second encoding technique comprises Group encoding.

27. The font cartridge as recited in claim 25 wherein the number of encode electrically generated binary data bits that will result by encoding the subject line according to the second preliminary encoding technique is determined using a mathematical algorithm.

28. Memory for storing electrically generated binary data wherein the electrically generated data includes group consisting of contiguous and identical electrically generated binary data bits, said memory being made by the computer-implemented process including the steps of:

calculating a first count value of the number of whole units of contiguous and identical electrically generated binary data bits in the group wherein a whole unit is a predetermined plural number of electrically generated binary data bits;

providing a first encoded portion indicating the first count value;

calculating a second count value equal to the number of electrically generated binary data bits in the group minus the quantity of the number of electrically generated binary data bits in each whole unit times the number of whole units calculated; and providing a second encoded portion indicating the second count value.

29. The memory as recited in claim 28 wherein the first encoded portion comprises a series of electrically generated binary data bits each having a first predetermined state wherein each electrically generated binary data bit represents a whole unit of identical electrically generated binary data bits in the group.

30. The memory as recited in claim 28 wherein the second encoded portion comprises a binary representation of the number of identical electrically generated binary data bits that remain after the number of identical electrically generated binary data bits in the group have been divided by the unit.

31. The memory as recited in claim 29 wherein the second encoded portion comprises a binary representation of the number of identical electrically generated binary data bits that remain after the number of identical electrically generated binary data bits in the group have been divided by the unit.

32. The memory as recited in claim 31 wherein the first encoded portion and the second encoded portion are separated by an indicator electrically generated binary data bit having a second predetermined state wherein the indicator electrically generated binary data bit is provided to indicate the end of the first encoded portion and the beginning of the second encoded portion and wherein the second predetermined state is opposite the first predetermined state.

33. The memory as recited in claim 31 wherein the number of electrically generated binary data bits that are provided in the second encoded portion is selected to enable binary representation of the predetermined number of electrically generated binary data bits in a group minus one.

34. The memory as recited in claim 33 wherein the unit is selected to equal eight electrically generated binary data bits and wherein three electrically generated binary data bits are provided for the second encoded portion.

35. A computer-implemented method for compressing a group consisting of contiguous and identical electrically generated binary data bits, said method comprising the steps of:

calculating a first count value of the number of whole units of contiguous and identical electrically generated binary data bits in the group wherein a whole unit is a predetermined plural number of electrically generated binary data bits;

providing a first encoded portion indicating the first count value;

calculating a second count value equal to the number of electrically generated binary data bits in the group minus a quantity resulting from the number of electrically generated binary data bits in each whole unit multiplied by the number of whole units calculated; and providing a second encoded portion indicating the second count value.

36. The method of claim 35 wherein the step of calculating the first count value includes dividing the number of electrically generated binary data bits in the group by the number of electrically generated binary data bits in each whole unit and the step of calculating the second count value includes calculating the remainder resulting from the dividing step.

* * * * *